J. WILLISON.
CAR COUPLING MECHANISM.
APPLICATION FILED MAY 20, 1905.

1,060,571.

Patented Apr. 29, 1913.

4 SHEETS—SHEET 1.

Witnesses
C. H. Walker.
H. S. Shepard.

Inventor
John Willison
by Bakewell & Byrnes
Attorneys

J. WILLISON.
CAR COUPLING MECHANISM.
APPLICATION FILED MAY 20, 1905.

1,060,571.

Patented Apr. 29, 1913.
4 SHEETS—SHEET 2.

WITNESSES

INVENTOR

J. WILLISON.
CAR COUPLING MECHANISM.
APPLICATION FILED MAY 20, 1905.

1,060,571.

Patented Apr. 29, 1913.
4 SHEETS—SHEET 3.

WITNESSES
R A Balderson.
Warren W. Swartz.

INVENTOR
John Willison
by Bakewell & Byrnes
his attys

J. WILLISON.
CAR COUPLING MECHANISM.
APPLICATION FILED MAY 20, 1905.

1,060,571.

Patented Apr. 29, 1913.
4 SHEETS—SHEET 4.

UNITED STATES PATENT OFFICE.

JOHN WILLISON, OF DERBY, ENGLAND, ASSIGNOR TO THE NATIONAL MALLEABLE CASTINGS COMPANY, OF CLEVELAND, OHIO, A CORPORATION OF OHIO.

CAR-COUPLING MECHANISM.

1,060,571.   Specification of Letters Patent.   Patented Apr. 29, 1913.

Application filed May 20, 1905.   Serial No. 261,326.

*To all whom it may concern:*

Be it known that I, JOHN WILLISON, a subject of the King of Great Britain, and a resident of Derby, Derby county, England, have invented a new and useful Car-Coupling Mechanism, of which the following is a full, clear, and exact description, reference being had to the accompanying drawings, forming part of this specification, in which—

Figure 1:
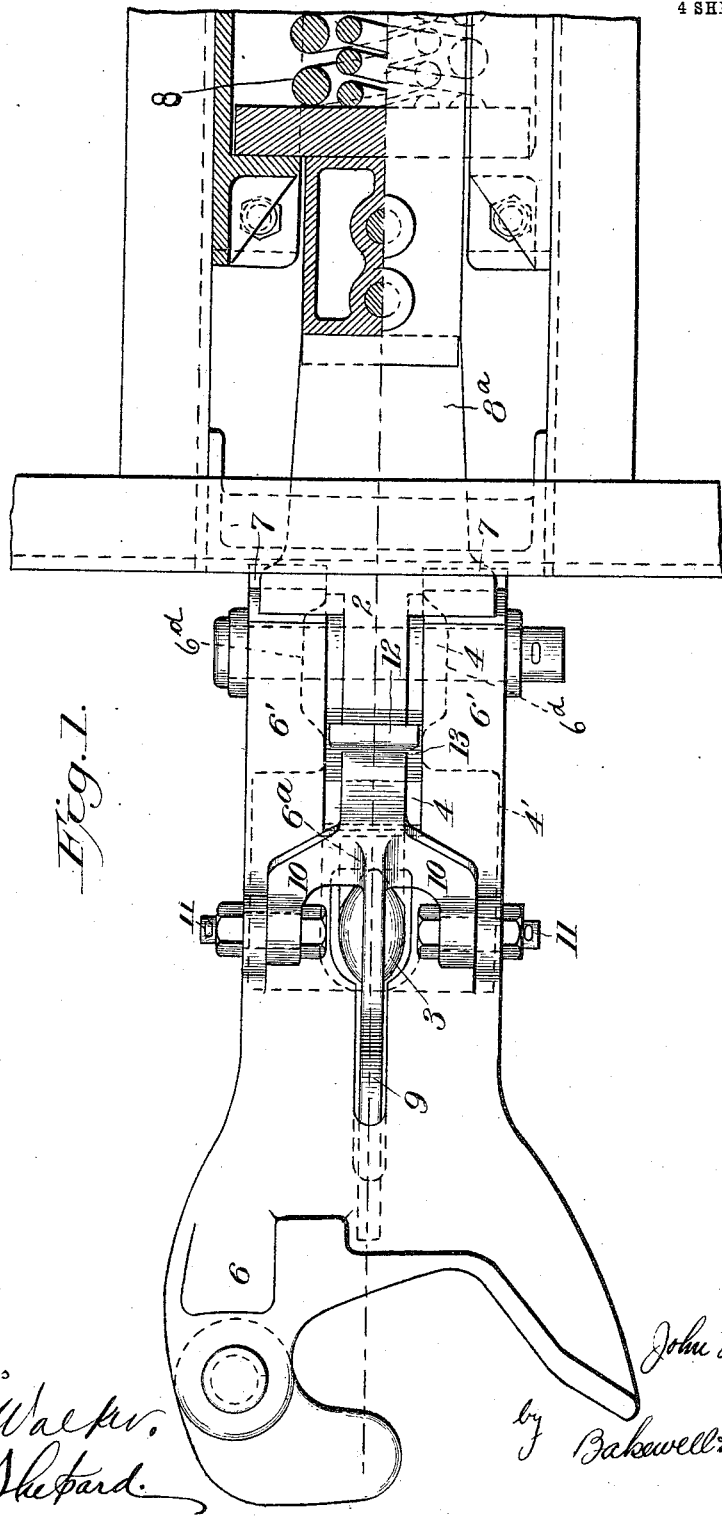
Figure 2:
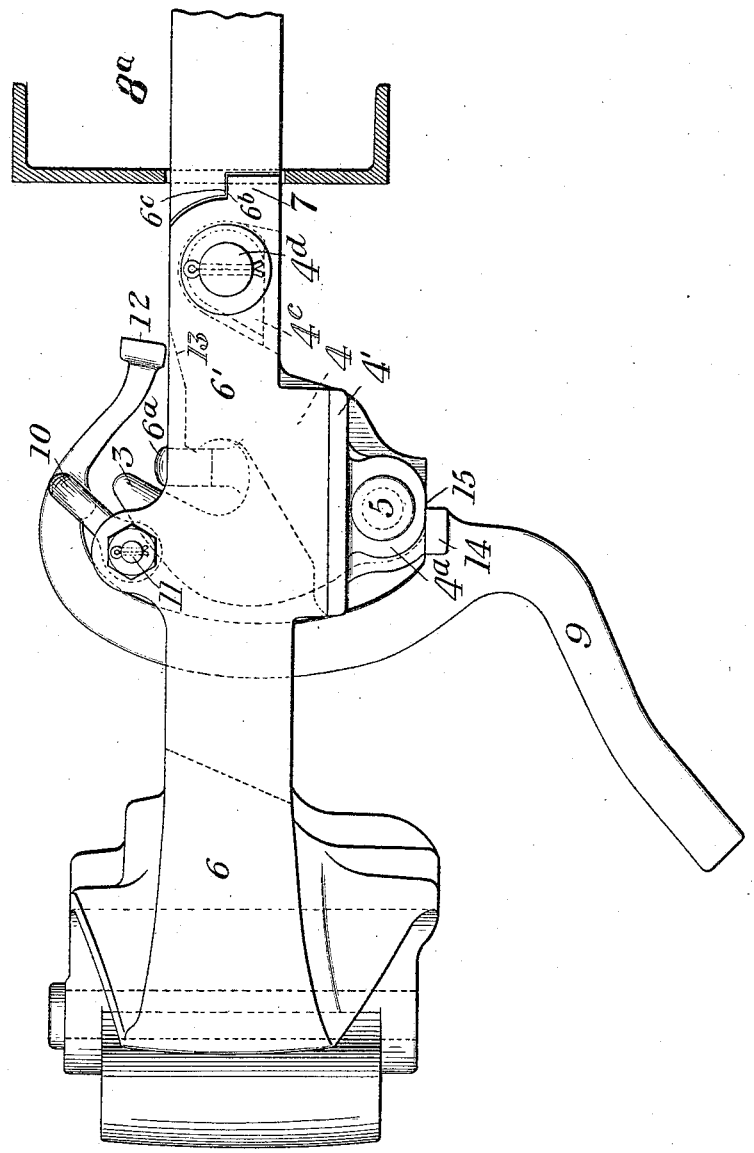
Figure 3:
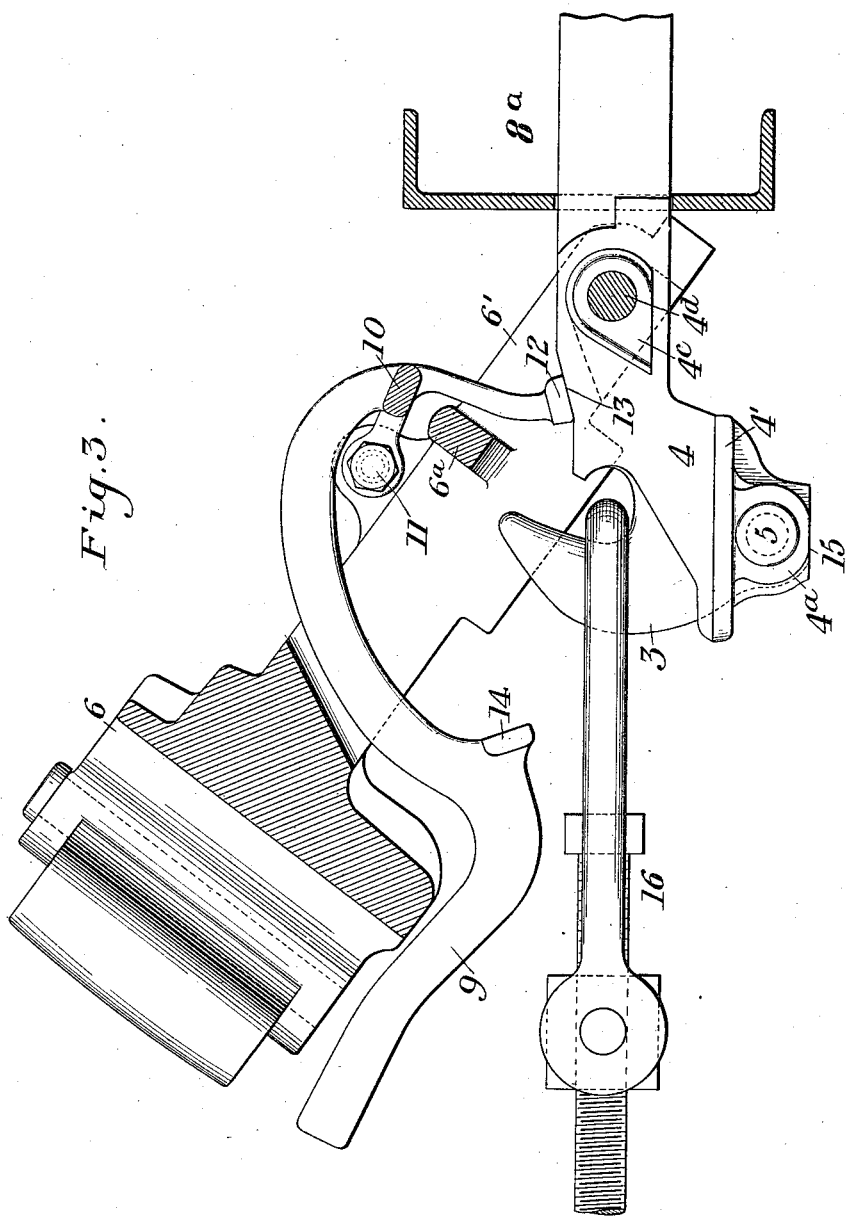
Figure 4:
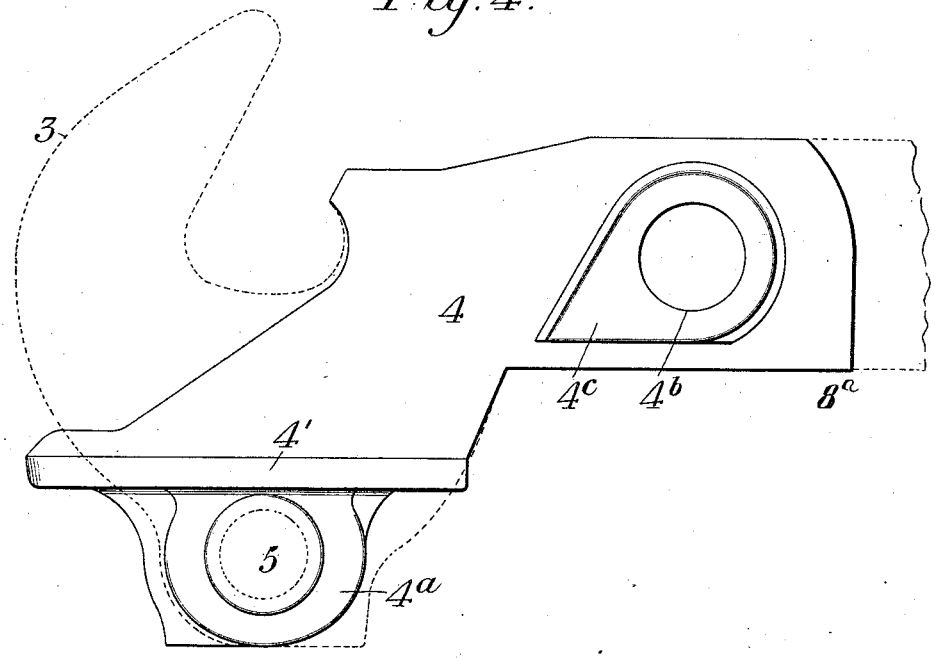
Figure 5:
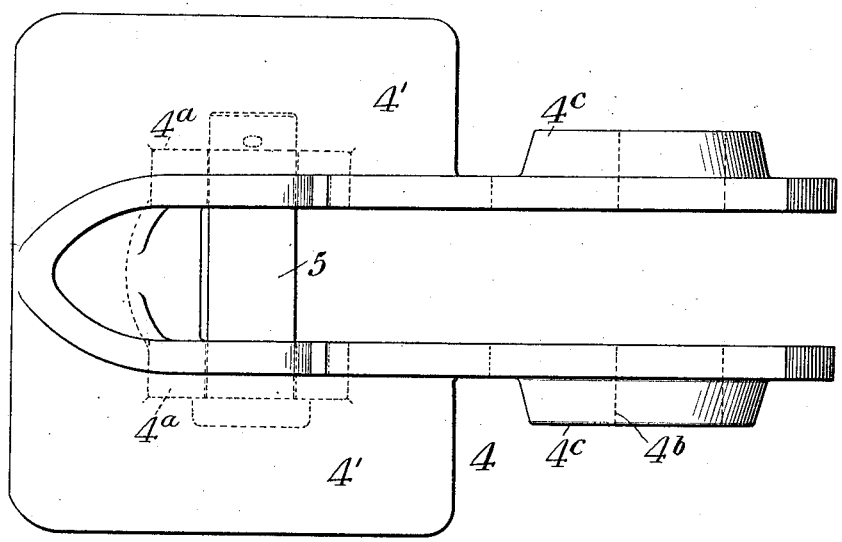

Figure 1 is a plan view of my improved coupler; Fig. 2 is a side elevation thereof; Fig. 3 is a sectional elevation showing the automatic coupler head swung upward out of alinement with the screw coupler; Fig. 4 is a detail view of the supporting piece and Fig. 5 is a plan view of the same.

The main purpose of my invention is to provide means for using conjointly an automatic coupler head and a coupler of another type such as the screw or link coupler commonly used on European railways.

One of the obstacles to the introduction on European railways of automatic couplers of the American type has been the fact that the cars on those railways are now equipped with the screw or link couplers, and it is necessary to provide the new cars not only with the American automatic coupling, but also with means which will enable them to be coupled with the wagons or cars of the type now in common use.

I accomplish the desired result by providing the car with a screw or link coupling of similar type and placed in the same position as in the present practice, and I pivot an automatic coupling preferably to the shank of the screw or link coupling in such manner that it can be swung upward out of the way of the screw or link coupling, leaving the latter free to be coupled to another car which has not been provided with an automatic coupling.

In the drawings, 2 represents the shank of a screw or link coupling having at its forward end a hook 3. For the purpose of supporting the automatic coupler, and also for connecting it firmly with the shank of the screw or link coupling, I employ a supporting piece 4 which is preferably a casting, and is forked so as to extend along both sides of the hook 3 and in front thereof, and has laterally extending supports or shelves 4'. This supporting piece has lugs $4^a$ provided with a hole through which it is connected by a pin 5 to the screw or link coupling and at the rear this piece has also a pin hole $4^b$ and lateral trunnions or projections $4^c$ surrounding the same. The supporting piece 4 is therefore connected to the screw or link coupling at two points, at which when the automatic coupling is in use the strains of draft are transmitted to the screw or link coupling.

6 is the automatic coupler which may be of suitable construction and has a shank which is forked as shown in the drawings, the two side portions of the shank being connected preferably by an intermediate web $6^a$. The side pieces 6' of the shank of the automatic coupling are provided with sockets or recesses $6^d$ shaped to receive the projections $4^c$ which therefore serve in the manner of trunnions to take the strain of draft, and they are connected thereto by the pin $4^d$, which passes through the shank of the automatic coupling, through the sides of the supporting piece 4 and through the shank 2 of the hook coupling.

When the automatic coupling is in use it is in horizontal position as shown in Fig. 2 and is supported by the shelves 4' of the piece 4; and when in that position as above explained strains of draft will be transmitted to the screw or link coupling through the supporting piece 4 at the two points $4^a$, $4^b$ and the pin $4^d$. The strains of buffing are not entirely transmitted to the shank of the screw or link coupling, but are taken up to a great extent by the abutment of the rear end of the shank of the automatic coupling with the shoulders 7 at the forward end of the draft-rigging 8. The purpose of this peculiar disposition of parts is to relieve the pivot pin $4^d$ of the greater portion of the buffing strains so as to avoid breakage of the pin under buffing actions.

The rear end of the shank of the automatic coupling, back of its pivot, is preferably formed with projections $6^b$ engaging a shoulder $6^c$ on the buffing member $8^a$ of the draft-rigging, which member is shown as being formed integrally with the shank 2 of the hook coupling, the opposing faces of these parts being preferably curved above the projections and shoulders. The latter constitute stops which aid in supporting the coupling when in working position and keep it from sagging.

For the purpose of lifting the automatic coupling out of the path of the screw or link coupling when the latter is to be used, I employ a lever 9 which passes through the middle portion of the forked shank of the automatic coupling and extends below the same. It has also a preferably forked extension or fulcrum piece 10 which is pivoted to lugs on the shank of the automatic coupling by means of pins 11. The rear end of the lever 9 has a foot 12 which forms the short arm of the lever, and when the lever is in elevated position is adapted to make contact with a preferably inclined surface 13 on the shank of the screw or link coupling in such manner as to support and hold the automatic coupling in lifted position as explained below.

The automatic coupling being in the position shown in Fig. 2, if it is desired to lift it so as to expose the screw or link coupling for use, the operator grasps the lower end of the lever 9 and raises it. The first motion of the lever frees a shoulder 14 thereon from engagement with a holding surface or shoulder 15 on the lower end of the supporting piece 4, and then the foot-piece 12 of the lever will engage the surface 13. This surface 13 will then act as the fulcrum of the lever, and as the lever is further lifted it will raise the coupling into the lifted position shown in Fig. 3. When this position has been reached, the foot 12 of the lever 9 will have passed in front of the point of support 11 of the automatic coupler upon the lever, and the lever will therefore support and lock the coupler in its raised position and will leave the hook 3 free to be coupled with the link 16 of an opposing car. In other words, when the point of support 11 of the automatic coupler upon the lever 9 has passed in rear of a line drawn at right angles to the inclined face 13 at the point of engagement therewith by the foot 12 of the lever 9, the lever will be locked so as to support the automatic coupler in operative position without employing extraneous means for the support of the coupler. To restore the automatic coupling to working position, the operator upholds the automatic coupling for a moment, either with his hand or with his shoulder, and then pulls down the lever 9 so as to free it from engagement with the surface 13 and allows the point of support 11 to pass the center line above mentioned, and then lowers the automatic coupler by means of the lever 9 to its original position. In its lowest position the portion 14 of the lever 9 engages the shoulder 15 and thus locks the automatic coupling in working position. It will be noticed that in these operations the lever 9 has a longer arc of motion than the automatic coupling 6, and to the extent of the difference in these arcs this lever renders the work of lifting the automatic coupler proportionately easy.

By the term "link-coupling" used in the claims I intend to cover not only the specific form of screw or link coupling shown in the drawings, but also forms of coupling other than automatic couplings.

Those skilled in the art will be able to modify the form and arrangement of the parts in many ways without departing from my invention as stated in the claims, since

What I claim is:—

1. In combination, a draft rigging, a hook-coupler, and an automatic coupler, the latter being directly connected to the hook-coupler for draft, and also having an association with the draft rigging for buffing and also to assist in supporting the automatic coupling in working position in addition to the support of the direct connection, said hook and automatic couplers being arranged to permit either one to be used independently of the other; substantially as described.

2. In combination with a link-coupling, an automatic coupling pivoted thereto and adapted to be moved upwardly, and a lever arranged to lift and hold the automatic coupling in an elevated position and provided with means for locking the coupling in its operative position; substantially as described.

3. In combination with a link-coupling, an automatic coupling pivoted thereto and adapted to be moved upwardly, and a lever arranged to lift and hold the automatic coupling in an elevated position, and provided with means for locking the coupling in its operative position, said lever being pivoted to the automatic coupling; substantially as described.

4. In combination with a link-coupling, an automatic coupling pivoted thereto and adapted to be moved upwardly, and a lever having a fulcrum bearing upon the link coupling and connected to the automatic coupling to lift the same; substantially as described.

5. In combination with a link coupling, a supporting piece fixed thereto and having a support for an automatic coupling, and a pivoted automatic coupling adapted to rest thereon; substantially as described.

6. In combination with a link-coupling, a supporting piece, an automatic coupling having a forked shank straddling the supporting piece and the shank of the link-coupling, and a pin piercing the shank of the automatic coupling, the supporting piece and the shank of the link coupling, the automatic coupling being pivotally mounted upon the pin and normally resting upon the supporting piece; substantially as described.

7. In combination with a hook-coupling, a supporting piece fixed thereto at more than one point, and an automatic coupling pivotally connected therewith; substantially as described.

8. In combination with a link-coupling, an automatic coupling pivoted thereto and adapted to be moved upwardly, and a lever arranged to lift the same and extending through a forked portion of the automatic coupling; substantially as described.

9. In combination with a link-coupling, an automatic coupling pivoted thereto and adapted to be moved upwardly, and a lever arranged to lift the same and having a foot adapted to engage a fulcrum surface; substantially as described.

10. In combination with a link-coupling, an automatic coupling pivoted thereto and adapted to be moved upwardly, and a lever arranged to lift the same and having a foot adapted to engage a fulcrum surface and having a certain amount of loose motion before it engages the same; substantially as described.

11. In combination with a link-coupling, an automatic coupling pivoted thereto and adapted to be moved upwardly, and a lever arranged to lift the same and having a foot adapted to engage the link-coupling; substantially as described.

12. In combination with a link-coupling, an automatic coupling pivoted thereto and adapted to be moved upwardly, and a lever arranged to lift the same and having a foot adapted to engage a fulcrum surface and movable to locking position past the dead center; substantially as described.

13. In combination with a link-coupling, an automatic coupling pivoted thereto and adapted to be moved upwardly, and a lever arranged to lift the same, said lever being arranged to engage a locking shoulder when it is in down position; substantially as described.

14. In combination with a link-coupling having a supporting piece, an automatic coupling having a forked shank connected to the supporting piece and to the shank of the link-coupling, said supporting piece having trunnion-like projections; substantially as described.

15. In combination with a link-coupling, an automatic coupling pivoted to the link-coupling and adapted to swing in a vertical plane, and a lever arranged to lock it in raised and in working position; substantially as described.

16. The combination with a hook coupling, of an automatic coupling pivoted to the hook coupling to swing upwardly, a stop back of the pivot connection, and the automatic coupling having a portion to engage the stop and hold the coupling when in working position; substantially as described.

17. The combination of a car coupler capable of being swung vertically, a lever having the coupler swung from an intermediate portion thereof, and a supporting surface upon which one end of the lever is capable of sliding to a position past the dead center for locking the lever and supporting the coupler in an elevated position.

18. The combination with a support, of a car coupler pivoted thereon to swing vertically, and a lifting lever having an arched portion from which the coupler is pivotally suspended, one end of the lever being in coöperative relation with the top of the support and capable of sliding thereon to a position past the dead center for locking the lever and supporting the coupler in an elevated position, the lever also having a shoulder to underlie the support and hold the coupler down in its normal position together with means for properly supporting the coupler in its normal position.

In testimony whereof, I have hereunto set my hand.

JOHN WILLISON.

Witnesses:
 ALFRED J. SYMES,
 HARRY E. ORR.

Copies of this patent may be obtained for five cents each, by addressing the "Commissioner of Patents, Washington, D. C."